US008526005B1

(12) United States Patent
Mason et al.

(10) Patent No.: US 8,526,005 B1
(45) Date of Patent: Sep. 3, 2013

(54) SYSTEM AND METHOD FOR CALIBRATING OPTICAL MEASUREMENT SYSTEMS THAT UTILIZE POLARIZATION DIVERSITY

(75) Inventors: James E. Mason, Palo Alto, CA (US); Melvin S. Ni, Cupertino, CA (US); Gregory S. Feller, Kentfield, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 455 days.

(21) Appl. No.: 12/892,756

(22) Filed: Sep. 28, 2010

Related U.S. Application Data

(60) Provisional application No. 61/297,239, filed on Jan. 21, 2010.

(51) Int. Cl.
- *G01B 9/02* (2006.01)
- *G01J 4/00* (2006.01)
- *G02B 5/30* (2006.01)
- *G02B 27/28* (2006.01)

(52) U.S. Cl.
USPC ............ 356/491; 356/364; 359/489.07

(58) Field of Classification Search
USPC ............ 356/364, 365, 491; 359/489.01, 359/489.06, 489.07
See application file for complete search history.

(56) References Cited

U.S. PATENT DOCUMENTS

| | | | |
|---|---|---|---|
| 3,873,207 A * | 3/1975 | Bryngdahl | 356/491 |
| 4,456,339 A | 6/1984 | Sommargren | |
| 5,286,313 A | 2/1994 | Schultz et al. | |
| 5,740,147 A | 4/1998 | Kase et al. | |
| 6,163,379 A | 12/2000 | De Groot | |
| 6,340,230 B1 | 1/2002 | Bryars et al. | |
| 6,384,956 B1 * | 5/2002 | Shieh | 359/256 |
| 6,614,573 B1 | 9/2003 | Cao | |
| 7,006,234 B1 * | 2/2006 | Cottrell et al. | 356/515 |
| 7,206,066 B2 | 4/2007 | Vurens et al. | |
| 2002/0191285 A1 | 12/2002 | Damask et al. | |
| 2003/0030805 A1 | 2/2003 | Oakberg | |
| 2003/0072512 A1 * | 4/2003 | Nagaeda et al. | 385/11 |
| 2003/0174921 A1 | 9/2003 | Nevis | |
| 2007/0132993 A1 | 6/2007 | Shibata | |

OTHER PUBLICATIONS

Wei-Quan Zhang, "New Phase Shift Formulas and Stability of Waveplate in Oblique Incident Beam," Optics Commuincations, Mar. 15, 2000, pp. 9-15, vol. 176.

Liu, et al., "Roll Angle Interferometer by Means of Wave Plates," Science Direct, Sensors and Actuators A, (2003), pp. 127-131, vol. 104.

\* cited by examiner

*Primary Examiner* — Michael A Lyons
(74) *Attorney, Agent, or Firm* — McDermott Will & Emery LLP

(57) ABSTRACT

A system and method of calibrating an optical measurement system utilizing polarization diversity is disclosed. A waveplate having a rotation axis is provided. A first light polarization component and a second light polarization component are caused to propagate in the waveplate while the waveplate is rotated about the rotation axis. An equal common phase shift is caused in the first and second light polarization components while a differential phase shift in the first and second light polarization components is maintained. A relative phase between the first and second light polarization components is sensed. At least one calibration parameter is determined based on the relative phase.

22 Claims, 7 Drawing Sheets

SYSTEM AND METHOD FOR CALIBRATING OPTICAL MEASUREMENT SYSTEMS THAT UTILIZE POLARIZATION DIVERSITY

CROSS-REFERENCE TO RELATED APPLICATION

The present application claims the benefit of U.S. Provisional Patent Application Ser. No. 61/297,239, entitled "REAL-TIME POLARIZATION DIVERSITY CALIBRATION TECHNIQUE" filed on Jan. 21, 2010, which is hereby incorporated by reference in its entirety for all purposes.

STATEMENT REGARDING FEDERALLY SPONSORED RESEARCH OR DEVELOPMENT

Not applicable.

BACKGROUND

1. Field

The subject technology relates generally to optical measurements, and more specifically to systems and methods for calibrating for optical measurement systems that utilize polarization diversity.

2. Background

A waveplate or retarder is an optical device that alters the polarization state of a light wave travelling through it. A waveplate works by shifting the phase between two perpendicular polarization components of the light wave. A typical waveplate is simply a birefringent crystal with a carefully chosen orientation and thickness. The crystal is cut so that the extraordinary axis or "optic axis" is parallel to the surfaces of the plate. Light polarized along this axis travels through the crystal at a different speed than light with the perpendicular polarization, creating a phase difference. Therefore, one of the two perpendicular polarization components experiences a retardation (e.g., slowdown) with respect to the other component in the waveplate. Such polarization diversity is utilized to propagate information in interferometric measurements and sensing systems.

Systems that use polarization diversity to propagate information are sensitive to drift and systematic effects in the birefringence and retardance of the optical components of the system. Calibration is required to characterize and compensate for (e.g., subtract out) these spurious effects. The update rate of calibration is dependent upon the time scales of drift and noise, balanced against sensing requirements. For example, in homodyne metrology where the relative phase of the two polarization components (e.g., in-phase (I) and quadrature (Q) sensing beams) are sensed to determine a position and/or a change in position, the systematic biases in retardance, diattenuation and birefringence need to be calibrated in order to accurately monitor motion to, e.g., a 100 pm level.

In conventional calibration methods, a motion is applied to the entire optical system in order to generate the >1 wave phase shift in the I and Q sensing polarizations. This is usually done by a deliberate actuation of a mirror, which also tends to modulate the data beam as well as the sensing beam. For systems with moderate drift and high precision requirements, these calibration procedures need to be performed frequently, thereby disturbing the normal operation (e.g., measurement or sensing) of the system.

Accordingly, a need exists in an optical measurement system that utilizes polarization diversity to provide a calibration procedure that can be performed without disturbing the measurement of the system.

SUMMARY

Systems and methods disclosed here can be used for extracting relevant parameters for calibration in an optical measurement system. In certain aspects of the present disclosure, the calibration can be achieved in real time without disturbing the normal operation (e.g., sensing and/or measurement) in the optical measurement system.

According to one aspect of the present disclosure, an optical measurement system utilizing polarization diversity is provided. The system can comprise a light source configured to transmit an incident light beam in a beam direction. The system can further comprise a waveplate having a rotation axis and configured to receive at least a portion of the incident light beam, the received incident light beam causing a first polarization component and a second polarization component to propagate in the waveplate. The waveplate is configured to rotate about the rotation axis to cause an equal common phase shift in the first and second polarization components while maintaining a differential phase shift in the first and second polarization components.

According to one aspect of the present disclosure, a method of calibrating an optical measurement system utilizing polarization diversity is disclosed. The method can comprise causing a first light polarization component and a second light polarization component to propagate in a waveplate having a rotation axis, while rotating the waveplate about the rotation axis. The method can further comprise causing an equal common phase shift in the first and second light polarization components while maintaining a differential phase shift in the first and second light polarization components. The method can further comprise sensing a relative phase between the first and second light polarization components. The method can further comprise determining at least one calibration parameter based on the relative phase.

According to one aspect of the present disclosure, a waveplate for use in an optical measurement system utilizing polarization diversity is provided. The waveplate can comprise a first plate comprising a first material and configured to receive an incident light beam and propagate therein a first light polarization component and a second light polarization component. The waveplate can further comprise a second plate comprising a second material coupled to the first material and configured to receive the first and second polarization light components from the first plate. The waveplate can have a rotation axis around which the waveplate is configured to be rotated with a minimum optical path difference between the first and second polarization components through the first and second plates. In one preferred aspect, in a retarder, there is a desired optical path difference between the two polarizations, and that difference is preserved.

According to one aspect of the present disclosure, an optical measurement system utilizing polarization diversity is provided. The system can comprise a light source configured to transmit an incident light beam. The system can further comprise a waveplate having a rotation axis and configured to receive at least a portion of the incident light beam, the received incident light beam causing a first polarization component and a second polarization component to propagate in the waveplate. The system can further comprise a rotation mechanism coupled to the waveplate and configured to rotate the waveplate about the rotation axis by a predetermined angle to cause an equal common phase shift in the first and second polarization components while maintaining a differential phase shift in the first and second polarization components. The system can comprise photodetectors disposed at an opposite side of the waveplate with respect to the light source and configured to receive a light beam emerging from the waveplate and convert the emerging light beam into electrical signals. The system can further comprise a signal conversion module configured to receive the electrical signals and convert the electrical signals into a digital representation. The system can further comprise a processor configured to receive the digital representation, sense a relative phase between the first and second light polarization components in the emerging light beam, and determine at least one calibration parameter based on the relative phase. The system can further comprise a memory in data communication with the processor and configured to store the at least one calibration parameter.

DETAILED DESCRIPTION

Figure 1:
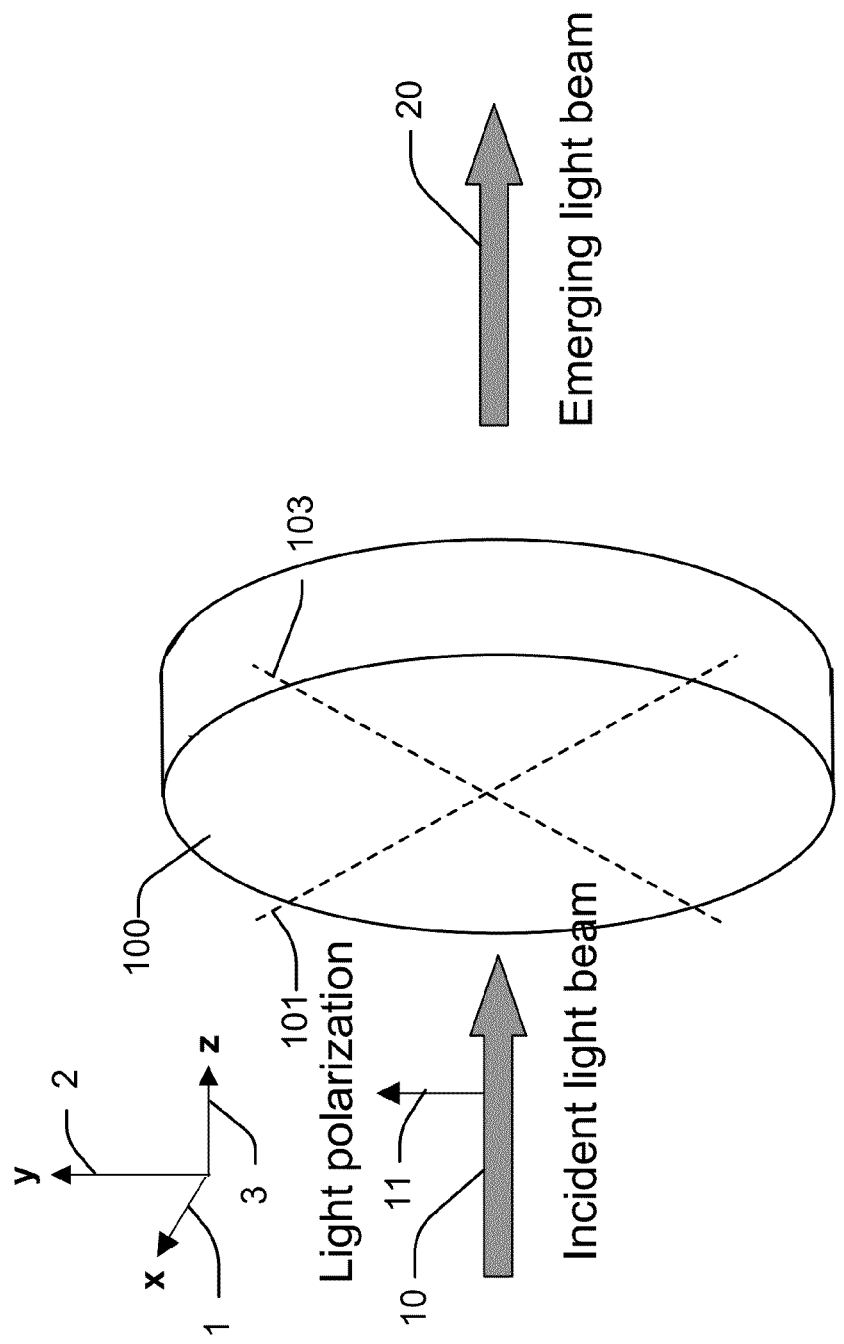
FIG. 1 is a diagram depicting a polarized light beam travelling along a first direction and incident on a waveplate.

FIG. 1 is a diagram depicting a polarized light beam 10 travelling along a first direction (e.g., z direction 3) and incident on a waveplate 100. The light beam 10 has a linear polarization 11 along a second direction (e.g., along y direction 2). The waveplate 100 is assumed to have an ordinary axis (o-axis) 101 and an extraordinary (e-axis) 103. The waveplate 100 is selected and oriented such that a desired phase shift between the two polarization components of light is achieved. For example, the orientation and thickness of the waveplate 100 is such that a quarter-wave phase shift between the polarization components is realized in an emerging light beam 20, thereby enabling quadrature phase measurements based on I and Q beams. For example, if the waveplate 100 is a quarter-waveplate, the light component associated with a larger index of refraction is retarded by 90° in phase (a quarter wavelength) with respect to that associated with a smaller index, such that the emerging light beam 20 becomes circularly polarized. In one aspect, the effective retardance needs to be ¼ wave for I and Q signals to be generated. It should be noted that in an example with the Michelson interferometer, the waveplate is ⅛ wave because the beam is double-passed.

According to certain aspects of the present disclosure, the waveplate 100 is part of a sensing or measurement system in which the waveplate 100 is inserted in the path of a sensing beam or sensing beams, but not in the path of a data beam. In another example, the waveplate 100 may be inserted in the path of a sensing beam or sensing beams as well as the path of a data beam depending on the data beam. The light beam 10 is linearly polarized, so typically (but not always) the polarization 11 of the light beam 10 is at 45 degrees to the o- and e-axes 101, 103 of the uniaxial crystal which comprises the waveplate 100. Therefore, the single polarization 11 of the light beam 10 may be thought of as being a sum of two polarizations along the o- and e-axes 101, 103 of the waveplate 100, and the light beam 10 having the single linear polarization 11 may be thought of as comprising two light rays, namely an ordinary ray (o-ray) polarized along the o-axis 101 and an extraordinary ray (e-ray) polarized along the e-axis 103.

One of the properties of the waveplate 10 is that it is configured to impart a predetermined relative phase shift between the o- and e-rays. However, for most sensing devices, it is desirable to modulate both o- and e-rays in phase by an equal amount to calibrate the optical system (e.g., the "bias" changes by the same amount, so the difference in phase shifts remains exactly the same). Conventionally, as indicated above, such modulation is achieved by motion of components of the optical system being calibrated.

Figure 2:
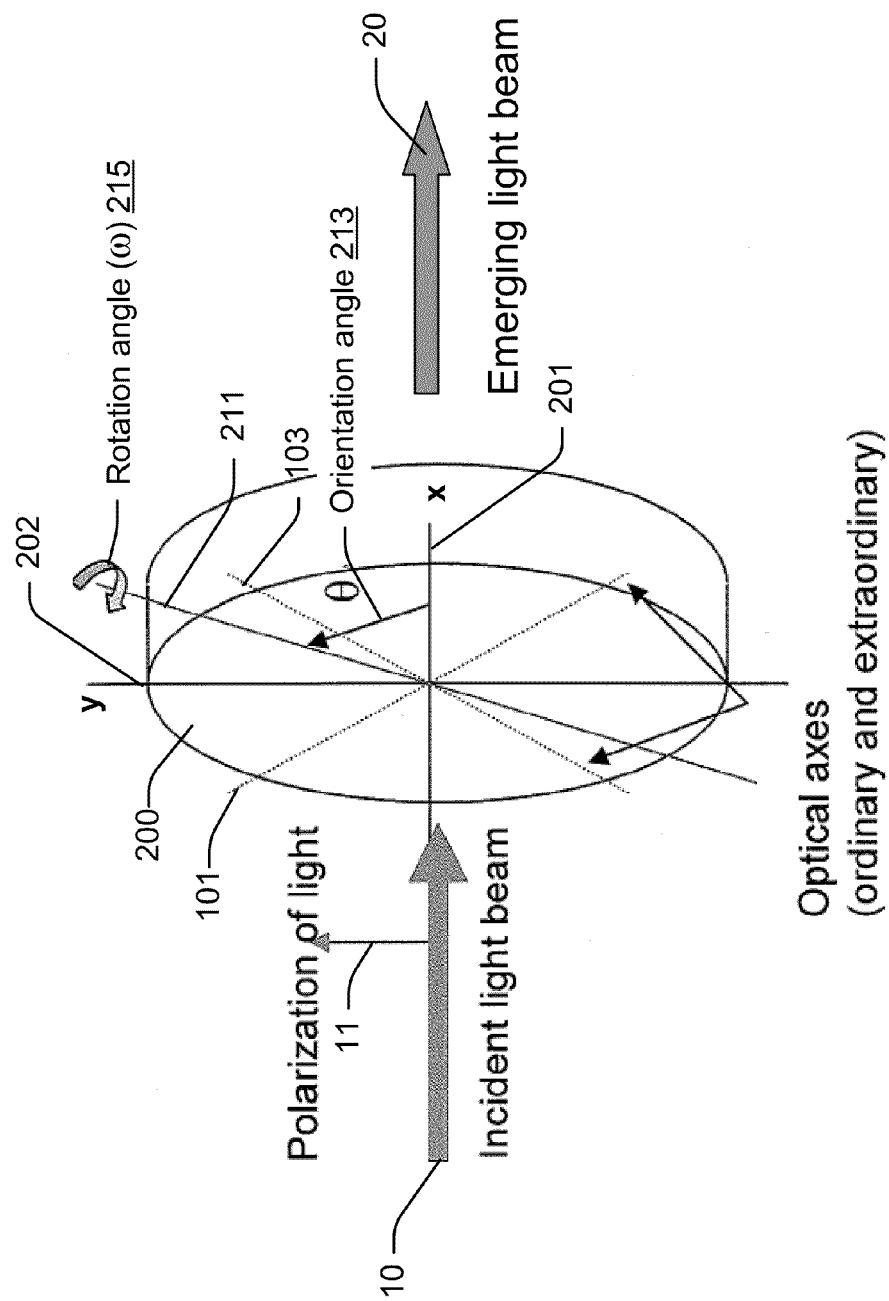
FIG. 2 is a diagram depicting a waveplate having a special rotation axis according to certain aspects of the present disclosure.

FIG. 2 is a diagram depicting a waveplate 200 having a special rotation axis 211 according to certain aspects of the present disclosure. A small rotation (e.g., shaking or wobbling) around or about the rotation axis 211 causes an equal common phase shift in the orthogonal polarizations (e.g., I and Q) in the emerging light beam 20 while maintaining a differential phase shift (e.g., 90°) necessary for the I and Q sensing. In the illustrated example, the rotation axis 211 is at a certain orientation angle (θ) 213 from an axis (e.g., x-axis) coplanar with the waveplate 200.

The rotation of the waveplate 200 about the rotation axis 211 makes it possible to modulate both o- and e-rays in phase by an equal amount so that the phase difference between the rays remains the same. During a calibration procedure, the waveplate 200 is rotated by a sufficient rotation angle (ω) 215 to generate at least one wave of common phase shift for fitting the curves and extracting the calibration parameters. In certain embodiments, the rotation angle (ω) 215 can be in a range, for example, between 1 and 2 degrees, depending on the wavelength of the light and the index of refraction of the waveplate material. Since the waveplate 200 is not present in the path of the data beam in certain sensing system embodiments, the data beam in such systems is undisturbed. Because the waveplate used to generate the I and Q sensing beams is also used to generate the common phase shift, the calibration can be performed without disturbance to the system under measurement, and so can either be done frequently or continuously in real-time, with no interruption to the data.

The existence and utilization of such a special rotation axis of a waveplate for calibration purposes is unexpected in view of the fact that, in general (e.g., except for the case of a special tilt axis), varying indices of refraction for the o- and e-rays cause the rays to refract through the material of the waveplate along different paths, thereby tending to change their relative phase shift. The calibration systems and methods of the present disclosure based on the rotation of a waveplate about a special rotation axis are shown to be applicable in spite of these facts.

Figure 3:
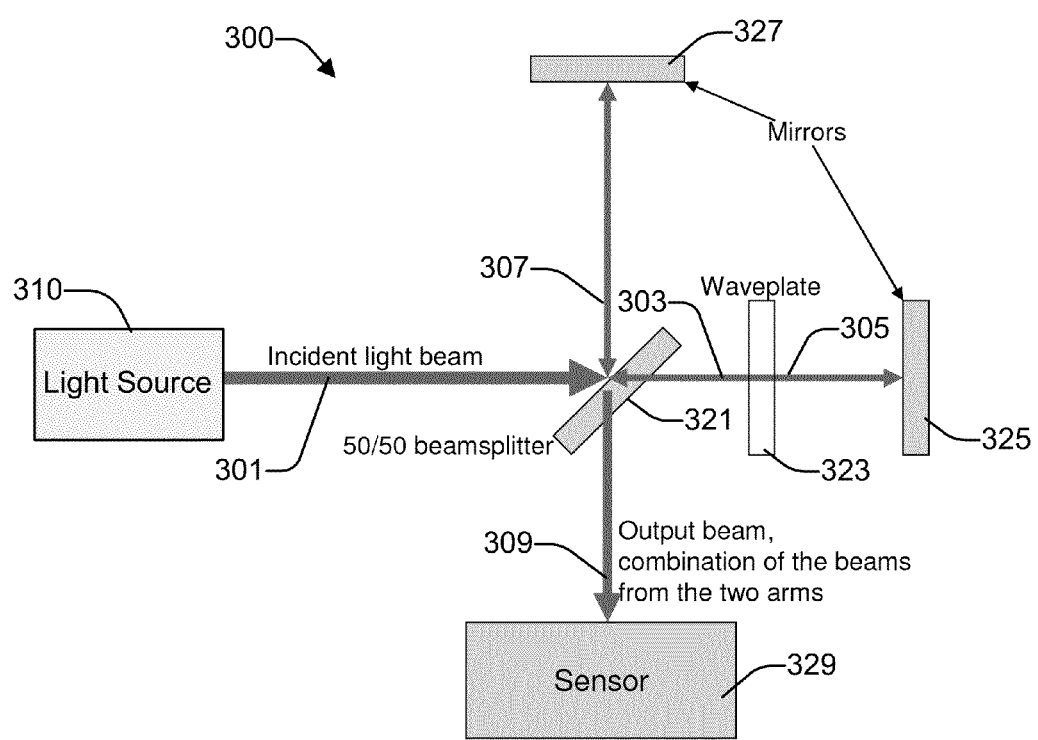
FIG. 3 is an exemplary optical measurement system according to certain aspects of the present disclosure.

FIG. 3 is an exemplary optical measurement system 300 according to certain aspects of the present disclosure. In the illustrated example of FIG. 3, the sensing system 300 is a Michelson interferometer. However, a person skilled in art shall understand in view of the present disclosure that the systems and methods of the present disclosure can be applied to other types of optical measurement systems based on polarization diversity including, but not limited to, an optical communication system, material properties characterization, and displacement path length metrology.

The sensing system 300 comprises a light source (e.g., a laser) 310, a beam splitter 321, a waveplate 323, first and second mirrors 325, 327, and a sensor 329. The light source, which can be a laser, transmits an incident light beam 301 towards the waveplate 323. The beam splitter 321 splits the incident light beam 301 into a first split light beam 303 and a second split light beam 307. The first split light beam 303 passes through the waveplate 323 and emerges therefrom as an emerging light beam 305. The emerging light beam 305 and the second split light beam 307 reflect from the first and second mirrors 325, 327, respectively, and travel back to the beam splitter 321 where they are combined and sent to the sensor 329 as a combined light beam 309. The sensor 329 uses the o- and e-ray polarizations of the combined light beam 309 to sense how much the first mirror 325 and/or the second mirror 327 has moved, for example. By rotating the waveplate 323 around a special rotation axis as discussed above, the sensing system 300 can be calibrated without disturbing the measurement thereof.

With reference to FIG. 2 for ease of illustration without any intent to limit the scope of the disclosure in any way, various systems and methods of determining the orientation angle (θ) 213 by which the special rotation axis 211 is rotated from an axis (e.g., x-axis 201) of the waveplate 200 are now described. The orientation angle (θ) 213 may vary depending on the materials used in the waveplate 200 (e.g., calcite) and the wavelength of the sensing light. Stated in another way, the orientation angle (θ) 213 may vary depending on the index of refraction of the material, which is a function of the wavelength of light and the material itself. The orientation angle (θ) 213 may also vary depending on the manner in which the waveplate 200 is constructed (e.g., single or multiple stacks). As the waveplate 200 is rotated or tilted by a rotation angle (ω) 215, the waveplate 200 appears thicker to the light beam travelling in the waveplate 200, which causes larger phase shifts in the polarization light components (e.g., the n- and e-rays) travelling therein. However, as long as the waveplate 200 is rotated about the special rotation axis 211, the phase shift for the o- and e-rays is the same, so the difference in the o- and e-ray phases remains the same.

There are, in general, two major categories of waveplates—multi-order and zero-order (0-order). A multi-order waveplate is a single plate of a birefringent material. A zero-order waveplate is made of two plates which have a specific thickness difference equal to the desired retardance of the waveplate and in which the o- and e-axes are oriented opposite to each other (i.e., the o-axis in one plate is parallel to the e-axis in the other plate, and vice versa). Zero-order waveplates are less sensitive to angle of incidence, and are accurate for a much larger range of wavelengths, which are the main advantages of such waveplates.

Figure 4:
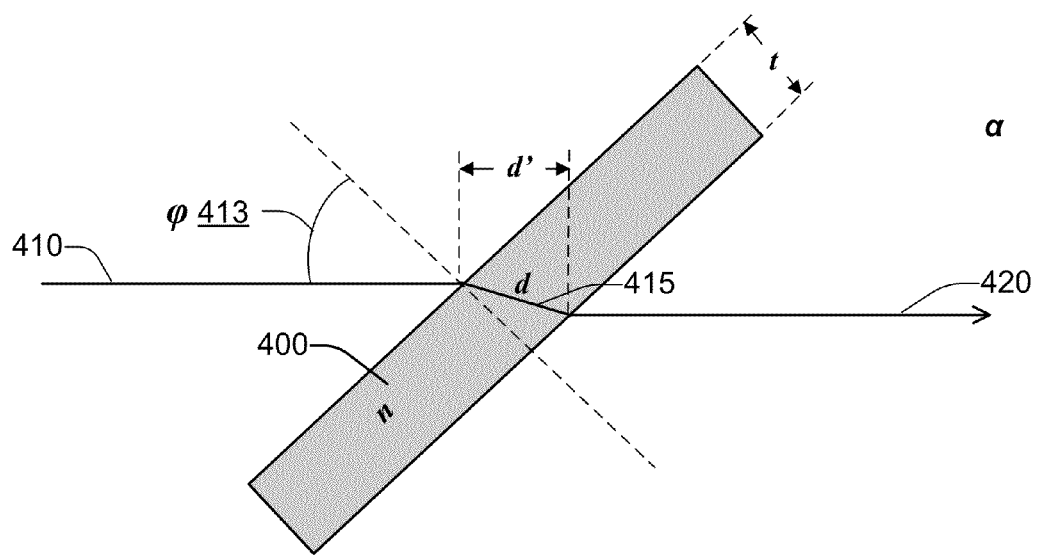
FIG. 4 is a diagram depicting light propagation through a waveplate having a single stack construction according to certain aspects of the present disclosure.

FIG. 4 is a diagram depicting light propagation through a waveplate 400 having a single stack construction according to certain aspects of the present disclosure. The waveplate 400 is assumed to comprise of a single optical material (e.g., calcite). It is further assumed that a monochromatic incident light beam 410 of linearly polarized light is incident on the waveplate 400 at an angle of incidence $\phi$ 413. The incident light beam 410 can be described then as a combination of an extraordinary ray (e-ray) and an ordinary ray (o-ray) by the projection of the polarization of the incident light beam 410 on an extraordinary axis (e-axis) and an ordinary axis (o-axis) 90° to the extraordinary axis in the plane of the waveplate 400. Typically, the polarization of the incident light beam 410 is oriented such that equal amounts of light are in the e- and o-rays (e.g., the polarization is oriented 45° to the e- and o-axes), but that is not required. In fact, the calibration methodology of the present disclosure allows for an imbalance in the amounts of light in the e- and o-rays. In one aspect, there may be substantially no constraints on the magnitude of $\phi$ 413; it is a parameter for optical design purposes (e.g., to reject ghost reflections, etc.). The magnitude of $\phi$ 413, however, cannot be greater than Brewster's angle; otherwise no light will go through the plate.

It is further assumed that a rotation axis (not shown) about or around which the waveplate 400 is tilted or rotated for calibration purposes is at an angle θ (not shown) relative to an axis (see, e.g., the x-axis 201 of FIG. 2). The angle θ, also referred hereinafter as a "wobble angle", defines the axis about which small rotations cause no change in the retardation of the waveplate, but provide a common phase shift for the polarization components (e.g., the e- and o-rays) travelling through the waveplate 400 for use in calibration.

In one aspect, the angle θ is determined by defining an equation for an optical path difference (OPD) as a function of θ. The OPD corresponds to a difference between optical path lengths (OPLs) through the waveplate 400 between the e-ray parallel to the e-axis and the o-ray parallel to the o-axis, which is normal to the e-axis. In one aspect, the derivative of the OPD is minimized with respect to ω (215). In one aspect, the OPD needs to be consistent with the retardation (i.e., the retardation phase is equal to 2 times pi times OPD divided by wavelength). One method of determining the angle θ involves iterating the angle θ (213), taking small steps in ω (215), calculating the delta OPD, and selecting the angle θ (213) where the delta OPD is the smallest. An analytical formula for $\partial OPD/\partial \omega$ (i.e., the derivative) can be derived and minimized by a method such as a simplex method, a trust-region method, Newton's method, or a line search method. These are examples, and other methods may also be used.

Firstly, general equations for light passing through a tilted parallel waveplate 400 are derived. These equations are used later when deriving the physical path lengths of light travelling through the waveplate 400 after solving for the angles of incidence. In FIG. 4, n refers to the refractive index of the optical material comprising the waveplate 400, t refers to the thickness of the waveplate 400, d refers to a physical path length of a light beam 415 within the waveplate 400, and d' refers to a physical distance coaxial to the light beam 415 between entrance and exit points on the parallel waveplate 400 (e.g., the thickness of the missing air).

For this configuration, the following relationships exist:

$$d = \frac{t}{\sqrt{1 - \left(\frac{\sin\varphi}{n}\right)^2}}$$

$$\varphi' = \sin^{-1}\left(\frac{\sin\varphi}{n}\right)$$

$$d' = t \cdot \cos(\phi - \phi')$$

Assuming that the waveplate 400 is a unixial crystal waveplate (e.g., quartz) with ordinary and extraordinary refractive indices $n_o$ and $n_e$, respectively, the polarization states of the incident light beam 410 can be decomposed into a first polarization component parallel to the o-axis and a second polarization component parallel to the e-axis. Because of the tilt or rotation of the waveplate 400, however, the angle of incidence varies for the e-axis, but not for the o-axis due to the symmetry of the uniaxial crystal. Hence, the following relationships:

$$\phi_o = \phi$$

$$\phi_e = 2\arcsin(\sin\phi/2 * \cos\theta),$$

where $\phi_o$ is the incidence angle with respect to the ordinary axis and is independent of rotational angle, and $\phi_e$ is the incidence angle with respect to the extraordinary axis and requires a coordinate transformation, and contains the dependence on the orientation or "wobble angle" $\theta$.

Solving through Snell's Law and the index ellipsoid, $\phi'_e$ and $\phi'_o$, the angles of the e- and o-rays after entering the waveplate 400, are given by:

$$n'_e = \frac{1}{\sqrt{\frac{(\sin\varphi_e)^2}{n_o^2} + \frac{(\cos\varphi_e)^2}{n_o^2}}}$$

$$\varphi'_o = \arcsin\left(\frac{\sin\varphi}{n_o}\right)$$

$$\varphi'_e = \sin^{-1}\left(\frac{\sin\varphi}{n'_e}\right)$$

The physical path length of the rays through the plate can be calculated as follows:

$$d_o = \frac{t}{\sqrt{1 - \left(\frac{\sin\varphi}{n_o}\right)^2}}$$

$$d_e = \frac{t}{\sqrt{1 - \left(\frac{\sin\varphi_e}{n'_e}\right)^2}}$$

The missing air for each ray can be calculated as follows:

$$d'_o = t \cdot \cos(\phi - \phi'_o)$$

$$d'_e = t \cdot \cos(\phi - \phi'_e)$$

The optical path length for each ray can be calculated as follows:

$$OPL_o = n_o \cdot d_o$$

$$OPL_e = n_e \cdot d_e$$

The optical path difference, with corrections due to the fact that the "missing air" is different for the two rays, can then be calculated. In other words, because the rays exit at different points on the surface of the waveplate, they will need to travel different distances to a reference plane.

$$OPD = (OPL_o - d'_o) - (OPL_e - d'_e)$$

Now, the value of the wobble angle $\theta$ can be found that allows the desired optical path difference (OPD) between the beams to remain constant while the OPL for both polarizations is increased with increasing $\phi$. The equation to be solved is:

$$\left.\frac{\partial OPD(\theta)}{\partial \omega}\right|_{\omega=0} = 0$$

The above expression can be used to find the value $\theta$ (213) for which the derivative of the OPD with respect to $\omega$ (215) is zero, evaluated at $\omega$ (215)=0. This can be done either by analytically deriving the derivative expression and solving for $\theta$ (213) for which it equals 0, or by doing finite differences (essentially a numerical derivative) of the OPD equation around $\omega$=0 for many values of $\theta$ (213) to find the value of $\theta$ (213) for which the numerical derivative is 0.

A typical waveplate has a multiple stack construction in which two plates of a birefringent material are stacked with their axes at 90° rotations with respect to each other and with thicknesses that differ according to a desired retardation. For example, an eighth-wave waveplate can be built using two plates with a thickness difference of $\Delta d = \lambda/8/\Delta n$, where $\lambda$ is the free-air wavelength of an incident light beam, and $\Delta n$ is the difference in the indices of refraction of the material between the o- and e-axes. The two plates can comprise the same material or different materials having different indices of refraction.

Figure 5:
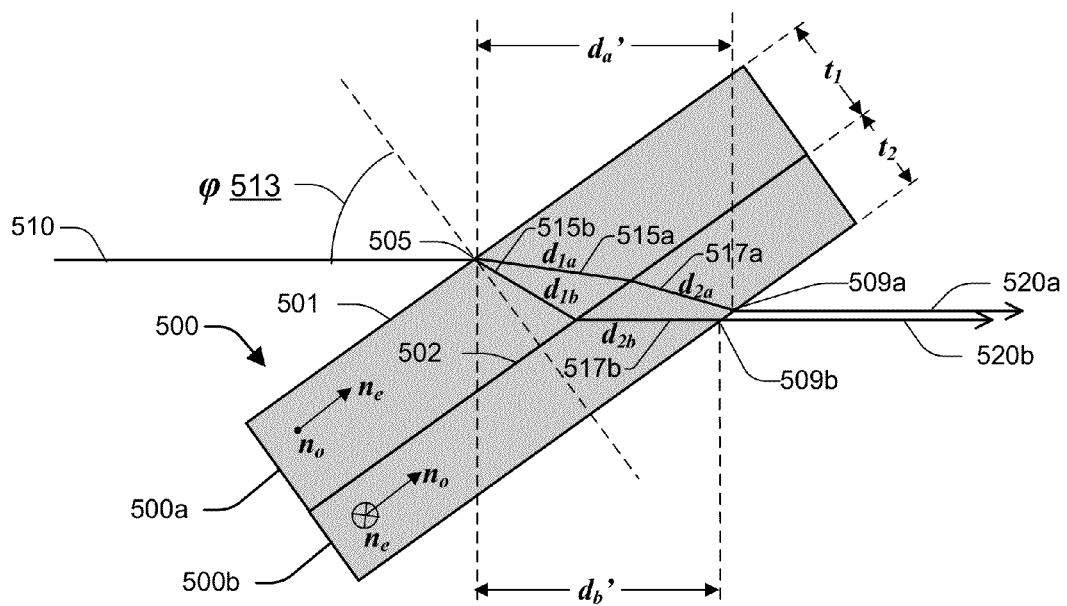
FIG. 5 is a diagram depicting light propagation through a waveplate having a two-stack construction according to certain aspects of the present disclosure.

FIG. 5 is a diagram depicting light propagation through a waveplate 500 having a first plate 500a and a second plate 500b according to certain aspects of the present disclosure. It is assumed that a monochromatic incident light beam 510 of linearly polarized light is incident on the waveplate 500 at an angle of incidence 513 at a first (air-to-the first plate 500a) interface 501. The incident light beam 510 comprises an extraordinary ray (e-ray) and an ordinary ray (o-ray) by the projection of the polarization of the incident light beam 510 on an extraordinary axis (e-axis) and an ordinary axis (o-axis) normal to the e-axis in the plane of the plate 500a. It is further assumed that a rotation axis (not shown) around which the waveplate 500 is tilted or rotated for calibration purposes is at an angle $\theta$ (not shown) relative to an axis (see, e.g., the x-axis 201 of FIG. 2). The angle $\theta$ defines the axis about which small rotations cause no change in the retardation of the waveplate 500, but provide a common phase shift for the light polarization components (e.g., the e- and o-rays) travelling through the waveplate 500 for use in calibration.

In FIG. 5, different subscripts will be used to identify separate light polarization components and the different plates 500a, 500b since the polarization which is oriented with the e-axis in the first plate 500a, is oriented with the o-axis in the second plate 500b. Subscripts "a" and "b" are used for the light polarization components once separated within the first plate 500a. "a" corresponds to an o-ray 515a associated with the o-axis in the first plate 500a, and "b" corresponds to an e-ray 515b associated with the e-axis in the first plate 500a. Subscripts "1" and "2" are used to denote the first and second plates 500a, 500b, respectively.

In FIG. 5, $n_o$ and $n_e$ refer to ordinary and extraordinary refractive indices of the optical material comprising the first and second plates 500, respectively; $t_1$ and $t_2$ refer to the thicknesses the first and second plates 500, respectively; $d_{1a}$ and $d_{1b}$ refer to the physical path lengths of the o- and e-rays 515a, 515b, respectively, within the first plate 500a; $d_{2a}$ and $d_{2b}$ refer to the physical path lengths of e- and o-rays 517a, 517b, respectively, within the second plate 500b; and $d_a'$ and $d_b'$ refer to physical distances coaxial to the two rays "a" and "b" between an entrance point 505 and respective exit points 509a, 509b on the waveplate 500 (e.g., the thicknesses of the missing air).

The equations for angles of incidence and distances the o- and e-rays travelling within the first plate 500a are given by:

$$n'_{e1} = \cfrac{1}{\sqrt{\cfrac{(\sin\varphi_e)^2}{n_o^2} + \cfrac{(\cos\varphi_e)^2}{n_o^2}}}$$

$$\varphi_{1a} = \arcsin\left(\frac{\sin\varphi}{n_o}\right)$$

$$\varphi_{1b} = \sin^{-1}\left(\frac{\sin\varphi}{n'_{e1}}\right)$$

$$d_{1a} = \cfrac{t_1}{\sqrt{1 - \left(\cfrac{\sin\varphi_o}{n_o}\right)^2}}$$

$$d_{1b} = \cfrac{t_1}{\sqrt{1 - \left(\cfrac{\sin\varphi_e}{n'_{e1}}\right)^2}}$$

Next, angles of incidence of the o- and e-rays 515a, 515b at a second (e.g., the first plate 500a-to-the second plate 500b) interface 502 are determined. As with the first interface 501, the angle of incidence for the o-ray 517a at the second interface 501b is simply the angle of incidence, while the angle of incidence for the e-ray 517b contains a dependence on θ.

Since the value of the variable θ is fixed with the decision to place a particular orientation for the first plate 500a, the effective rotation angle of the second plate 500b is 90°−θ. That changes the function of the internal incidence angle along the e-axis in the second waveplate 500b to:

$$\varphi_{e2} = 2\arcsin(\sin\varphi/2 \cdot \sin\theta)$$

while the function for $\varphi_o$ remains unchanged. Thus the functions for the lengths of the optical paths in the second plate 500b are given by:

$$n'_{e2} = \cfrac{1}{\sqrt{\cfrac{(\sin\varphi_{e2})^2}{n_o^2} + \cfrac{(\cos\varphi_{e2})^2}{n_o^2}}}$$

$$d_{2a} = \cfrac{t_2}{\sqrt{1 - \left(\cfrac{\sin\varphi_e}{n'_{e2}}\right)^2}}$$

$$d_{2b} = \cfrac{t_2}{\sqrt{1 - \left(\cfrac{\sin\varphi_e}{n_o}\right)^2}}$$

Because of the varying geometries and angles of refraction changes, the two rays "a" and "b" exit the second plate 500b at different points on the exterior surface of the second plate 500b. As they do, they then travel different path lengths through the air. This differential path, also referred to as the differential missing air path, is determined. Referring to FIG. 5 again, the differential path can be determined by calculating the distance, $d_b'$, $d_b'$ parallel to the in-air beam path from the entrance point 505 of the first waveplate 500a to the exit point 509a, 509b of the second waveplate 500b for each ray. The results are given by:

$$d_a' = d_{1a}\cos[\phi-\phi_{1a}] + d_{2a}\cos[\phi-\phi_{2a}]$$

$$d_b' = d_{1b}\cos[\phi-\phi_{1b}] + d_{2b}\cos[\phi-\phi_{2b}]$$

It should be noted that the missing air paths are $d_a'$ and $d_b'$. Missing air can be understood in the context of the light travelling through the air to the plate. It leaves the plate and travels through the air along a path parallel to the incident light. The distance between those two planes in which the light has been travelling in glass can be considered as the missing air. In one aspect, the missing air can be utilized to determine the difference in the paths because the two rays come out of the glass at different locations.

Now the effect of tilt angle on optical path length (OPL) can be calculated for each polarization path:

$$OPL_a = d_{1a} \cdot n_o + d_{2a} \cdot n'_{a2}$$

$$OPL_b = d_{1b} \cdot n'_{a1} + d_{2b} \cdot n_o$$

using the effective index of refractions that is defined above.

Finally, the optical path difference between the different polarization paths can be calculated by subtracting the two optical path lengths, with corrections for the fact that the two rays "a" and "b" exit at the different exit points 509a, 509b due to the different angles of refraction.

$$OPD = (OPL_a - d'_a) - (OPL_b - d'_b),$$

The corrections account for the fact that the beams 520a, 520b exit at two different points.

Now, the value of the wobble angle θ can be found that allows the desired optical path difference (OPD) between the beams to remain constant while the OPL for both polarizations is increased with increasing φ. The equation to be solved is:

$$\left.\frac{\partial OPD(\theta)}{\partial \omega}\right|_{\omega=0} = 0$$

The above expression can be used to find the value θ (213) for which the derivative of the OPD with respect to ω (215) is zero, evaluated at ω (215)=0. This can be done either by analytically deriving the derivative expression and solving for θ (213) for which it equals 0, or by doing finite differences (essentially a numerical derivative) of the OPD equation around ω=0 for many values of θ (213) to find the value of θ (213) for which the numerical derivative is 0.

Figure 6:
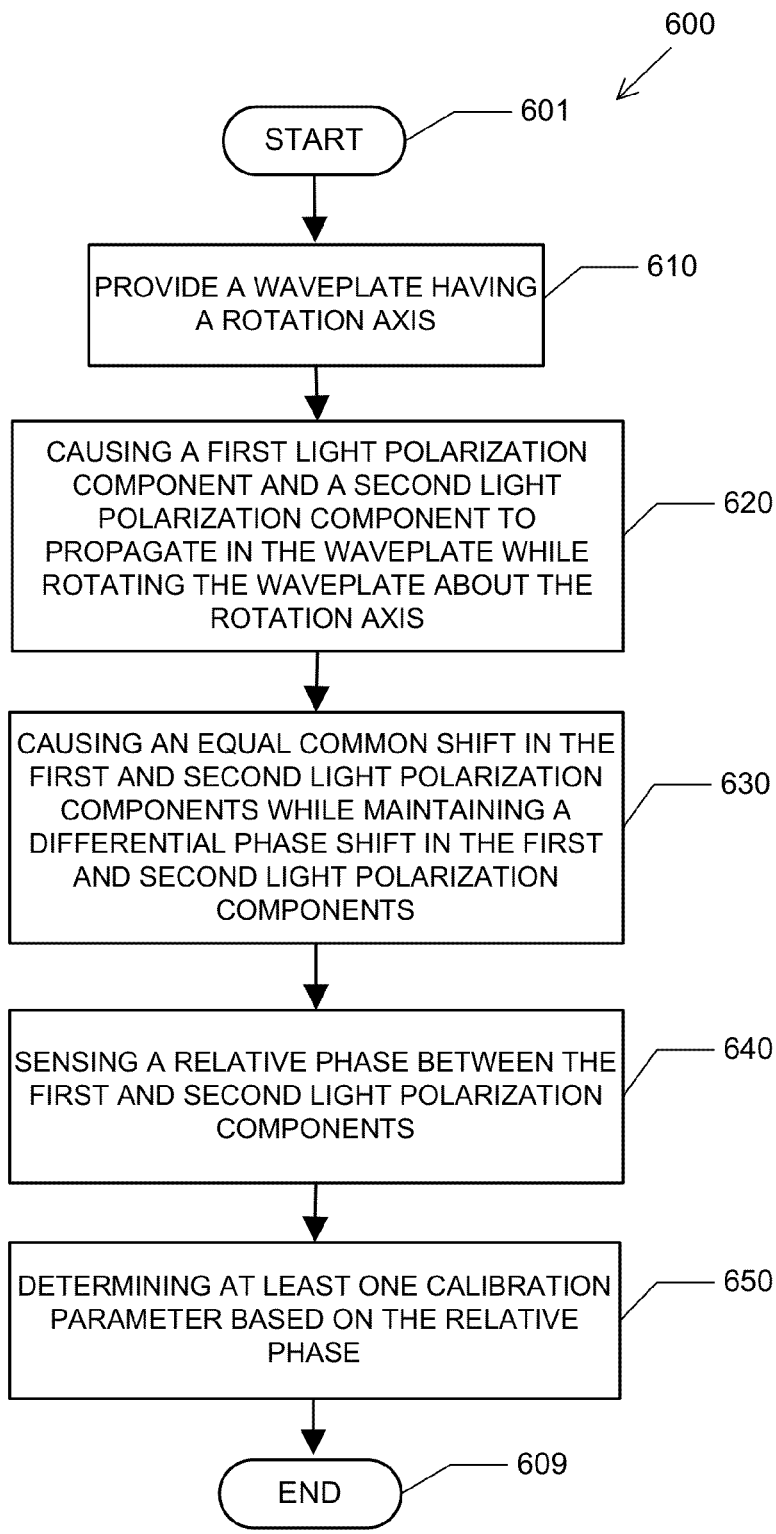
FIG. 6 is a flowchart illustrating an exemplary process for calibrating an optical measurement system utilizing polarization diversity.

FIG. 6 is a flowchart illustrating an exemplary process 600 for calibrating an optical measurement system utilizing polarization diversity. The process 600 begins at start state 601 and proceeds to operation 610 in which a waveplate having a special rotation axis is provided. In certain embodiments, the waveplate comprises a single plate of a birefringent material (e.g., calcite). In some embodiments, the waveplate comprises a stack of a first plate of a first birefringent material crystal and a second plate of a second birefringent material. In one aspect, the two plates used in a zero-order waveplate must have a very specific differential thickness, although an individual thickness can be as much as desired. The waveplate produces a known retardation in the light passing therethrough, where the retardation depends on the thickness(es) of the one or more plates and indices of refraction of the one or more birefringent materials.

In certain embodiments, the operation 610 includes determining an orientation direction of the rotation axis. As described with respect to FIGS. 4 and 5, this can be achieved by first defining an equation for an optical path difference (OPD) between the first and second polarization components through the waveplate as a function of an orientation angle (e.g., θ 213 of FIG. 2) for the rotation axis, and then minimizing the derivative of OPD with respect to ω (215).

The process 600 proceeds to operation 620 in which a first light polarization component and a second light polarization component (e.g., the "a" and "b" rays in FIG. 5) propagate in the waveplate while the waveplate is rotated about the rotation axis. The operation 620 can involve directing an incident light beam (e.g., 10 of FIG. 1, 301 of FIG. 3, 410 of FIG. 4, 510 of FIG. 5) towards the waveplate. In the illustrated embodiment of FIG. 3, the incident light 301 is split into the first split light beam 303 and the second light beam 307, where the first split light beam 303 is then incident on the waveplate 321.

The process 600 proceeds to operation 630 in which an equal common shift in the first and second light polarization components while a differential phase shift (e.g., a quarter-wave Shift) is maintained in the first and second light polarization components. As described above, this is a consequence of rotating the waveplate about the special rotation axis.

The process 600 proceeds to operation 640 in which a relative phase between the first and second light polarization components is sensed. In certain embodiments, the operation 640 involves a phase detector receiving a light beam emerging from the waveplate with the first and second light polarization components contained therein.

The process 600 proceeds to operation 650 in which at least one calibration parameter is determined based on the relative phase between the first and second light polarization components. In certain embodiments, the at least one calibration parameter includes a polarization shift between the first and second light polarization components caused by one or more spurious effects such as drift and systematic effects in the birefringence and retardance of the optical components of the optical system. Typically, there may be several systematic errors/biases which cause measurement errors. Additionally, these systematic errors may have a tendency to drift over time, degrading the calibration. An aspect of the subject technology can calibrate these systematic errors. In certain embodiments, the operation 650 includes fitting a curve with values representative of the relative phase between the first and second light polarization components as a function of a rotation angle (e.g., ω 215 of FIG. 2) by which the waveplate is rotated about a rotation axis (e.g., 211 of FIG. 2), and extracting calibration parameter(s) from the curve.

Figure 7:
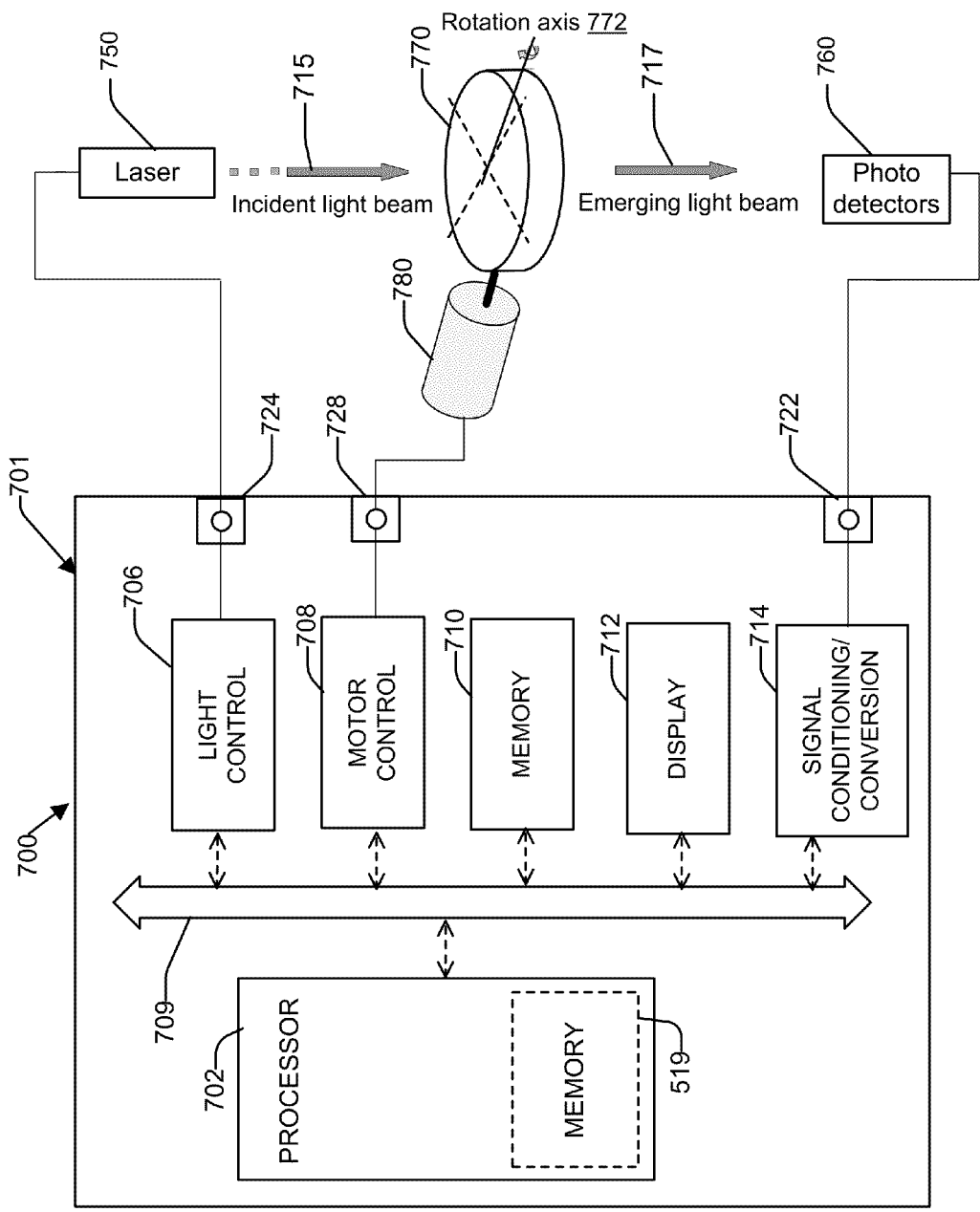
FIG. 7 is a schematic block diagram of an exemplary optical measurement system utilizing polarization diversity and configured to be calibrated according to certain aspects of the present disclosure.

FIG. 7 is a schematic block diagram of an exemplary optical measurement system utilizing polarization diversity and configured to be calibrated according to certain aspects of the present disclosure. The system 700 includes a control/analysis unit 701, a light source 750 (e.g., a laser), a waveplate 770 having a rotation axis 772, a rotation mechanism 780 (e.g., a motor) mechanically coupled to the waveplate 770, and photodetectors 760 (e.g., photodiodes). In the illustrated example of FIG. 7, the control/analysis unit 701 includes a processor 702, which can be a desktop computer or a laptop computer. The processor 702 is capable of communication with a laser control module 706 and a motor control module 708 through a bus 709 or other structures or devices. It should be understood that communication means other than buses can be utilized with the disclosed configurations.

The processor 702 may include a general-purpose processor or a specific-purpose processor for executing instructions and may further include an internal memory 719, such as a volatile or non-volatile memory, for storing data and/or instructions for software programs. The instructions, which may be stored in a memory 710 and/or 719, may be executed by the processor 702 to control and manage access to the various networks, as well as provide other communication and processing functions. The instructions may also include instructions executed by the processor 702 for various user interface devices, such as a display 712 and a keyboard or keypad (not shown).

The processor 702 may be implemented using software, hardware, or a combination of both. By way of example, the processor 702 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium (e.g., 719, 710) that stores software for control, analysis and other processing functions can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processing system, such as might be the case with an ASIC. Machine-readable media (e.g., 710) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 702. According to one aspect of the disclosure, a machine-readable medium is a computer-readable medium or computer-readable storage medium encoded or stored with instructions and is a computing element, which defines structural and functional interrelationships between the instructions and the rest of the system, which permit the instructions' functionality to be realized. Instructions can be, for example, a computer program including code.

The light control module 706 may be a hardware module or a software module or a combination of both (e.g., a firmware) and may contain hardware components and/or control programs that are configured to control the light source 750, which needs to be a narrow band laser in a preferred embodiment. The light control module 706 is configured to send one or more control signals to the light source 750 via an output port 724, thereby causing the light source 750 to transmit an incident light beam 715 towards the waveplate 770. In a preferred embodiment, the light must be monochromatic linearly polarized light. In certain embodiments, the light control module 706 is part of and resides in the light source 750.

The motor control module 708 may be a hardware module or a software module or a combination of both (e.g., a firmware) and may contain hardware components and/or control programs that are configured to control the rotation mechanism 780, which can be any electrically controlled motor including, but not limited to, a server motor or a stepper motor. The motor control module 708 is configured to send one or more control signals (e.g., PWM pulses) to the rotation mechanism 780 via an output port 728, thereby causing the rotation mechanism 780 to rotate the waveplate 770 about a rotation axis 772 by a predefined rotation angle. The light can be monochromatic linearly polarized light. In certain embodiments, the rotation mechanism may include an encoder that sends information indicative of an angular position of the waveplate 750 to the motor control module 708 and/or the processor 702.

In the illustrated example of FIG. 7, the photodetectors 760 (e.g., photodiodes) is disposed at an opposite side of the waveplate 770 with respect to the light source 750. A light beam 717 emerging from the waveplate 770 is detected by the photodetectors 760, which converts the detected emerging light beam 717 into electrical signals. As described above, the emerging light beam 717 can contain two light polarization components that have a relative phase therebetween. The electrical signals outputted by the photodetectors 760 are received by a signal conditioning/conversion module 714 via an input port 722. The signal conditioning/conversion module 714 conditions (e.g., filters and amplifies) the electrical signals and converts (e.g., digitizes) them into a digital representation. The digital representation is then received and processed (e.g., analyzed) by the processor 702 to sense the relative phase between two light polarization components in the emerging light beam 717. An input/output port may refer to one or more input/output ports.

Certain aspects of calibration processes (e.g., process 600) for an optical measurement system utilizing polarization diversity can be implemented in a processor (e.g., 702 of FIG. 7) and a memory (e.g., 719, 710). For instance, the operation 640 for sensing a relative phase between the first and second light polarization components and the operation 650 for determining at least one calibration parameter (e.g., a polarization shift caused by spurious effects) may be performed by the processor 702. Various coefficients and parameters (e.g., rotation angles and curve-fitting parameters) associated with the above sensing and determination and results thereof (calibration parameters) may be stored in the memory 710, 719. Some results, such a fitted curve and calibration parameter extracted therefrom may be displayed on the display 712.

In one aspect, a preferred configuration requires the output sensor to be a polarizing beam splitter (to separate the two polarizations) and two photodetectors.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An optical measurement system utilizing polarization diversity, comprising:
   a light source configured to transmit an incident light beam in a beam direction; and
   a waveplate having a rotation axis and configured to receive at least a portion of the incident light beam, the received incident light beam causing a first polarization component and a second polarization component to propagate in the waveplate,
   wherein the waveplate is configured to rotate about the rotation axis to cause an equal common phase shift in the first and second polarization components while maintaining a differential phase shift in the first and second polarization components.

2. The optical measurement system of claim 1, wherein the waveplate is configured to produce a quarter-wave phase shift between the first and second polarization components.

3. The optical measurement system of claim 1, wherein the waveplate comprises a first birefringent crystal having a first ordinary index of refraction along a first ordinary axis, and a first extraordinary index of refraction along a first extraordinary axis.

4. The optical measurement system of claim 3, wherein the waveplate comprises a plane normal to the beam direction and defined by a first direction and a second direction normal to the first direction, wherein:
   one of the first ordinary axis and the first extraordinary axis is at a first predetermined angle from the first axis, and the rotation axis is at a second predetermined angle from the first axis.

5. The optical measurement system of claim 3, wherein the first polarization component includes an ordinary light ray having a first polarization aligned along the first ordinary axis, and the second polarization component includes an extraordinary light ray having a second polarization aligned along the first extraordinary axis.

6. The optical measurement system of claim 3, wherein the waveplate comprises:
a first plate comprising the first birefringent crystal having the first ordinary axis and the first extraordinary axis; and
a second plate coupled to the first plate and comprising a second birefringent crystal having a second ordinary axis and a second extraordinary axis.

7. The optical measurement system of claim 6, wherein the second ordinary axis is aligned with the first extraordinary axis, and the second extraordinary axis is aligned with the first ordinary axis.

8. The optical measurement system of claim 1, wherein the optical measurement system is an interferometric sensing system.

9. The optical measurement system of claim 8, wherein the interferometric sensing system is a Michelson interferometer.

10. The optical measurement system of claim 1, wherein the optical measurement system is an optical communication system.

11. The optical measurement system of claim 8, wherein the interferometric sensing system comprises a beam splitter configured to split the incident light beam into a first split light beam travelling in a first beam direction and a second split light beam travelling in a second beam direction normal to the first beam direction, wherein the waveplate is placed in the path of the second split light beam.

12. The optical measurement system of claim 11, further comprising:
a first mirror configured to reflect an emerging light beam exiting from the waveplate;
a second mirror configured to reflect the second split light beam; and
a sensor configured to:
receive a combined light beam comprising the reflected emerging light beam and the reflected second split light beam, and
sense a change in position of at least one of the first and second mirrors based on the received combined light beam.

13. The optical measurement system of claim 3, further comprising at least one processor configured to sense a relative phase between the first and second polarization components and determine at least one calibration parameter based on the relative phase.

14. A method of calibrating an optical measurement system utilizing polarization diversity, comprising:
causing a first light polarization component and a second light polarization component to propagate in a waveplate having a rotation axis while rotating the waveplate about the rotation axis;
causing an equal common phase shift in the first and second light polarization components while maintaining a differential phase shift in the first and second light polarization components;
sensing a relative phase between the first and second light polarization components; and
determining at least one calibration parameter based on the relative phase.

15. The method of claim 14, further comprising:
transmitting an incident light towards the waveplate; and
splitting the incident light beam into a first split light beam travelling in a first beam direction and a second split light beam travelling in a second beam direction normal to the first beam direction, the waveplate being placed in the path of the second split light beam.

16. The method of claim 14, wherein the waveplate comprises a single plate of a birefringent crystal.

17. The method of claim 14, wherein the waveplate comprises a first plate of a first birefringent crystal and a second plate of a second birefringent crystal coupled to the first birefringent crystal.

18. The method of claim 14, wherein the at least one calibration parameter comprises a polarization shift between the first and second light polarization components caused by one or more spurious effects.

19. The method of claim 14, further comprising determining an orientation direction of the rotation axis.

20. The method of claim 19, wherein determining the orientation direction comprises defining an equation for an optical path difference (OPD) between the first and second polarization components through the waveplate as a function of an orientation angle for the rotation axis, and minimizing a derivate of the OPD with respect to a rotation angle.

21. A waveplate for use in an optical measurement system utilizing polarization diversity, the waveplate comprising:
a first plate comprising a first material and configured to receive an incident light beam and propagate therein a first light polarization component and a second light polarization component; and
a second plate comprising a second material coupled to the first material and configured to receive the first and second polarization light components from the first plate,
wherein the waveplate has a rotation axis around which the waveplate is configured to be rotated with a minimum optical path difference between the first and second polarization components through the first and second plates.

22. An optical measurement system utilizing polarization diversity, comprising:
a light source configured to transmit an incident light beam;
a waveplate having a rotation axis and configured to receive at least a portion of the incident light beam, the received incident light beam causing a first polarization component and a second polarization component to propagate in the waveplate;
a rotation mechanism coupled to the waveplate and configured to rotate the waveplate about the rotation axis by a predetermined angle to cause an equal common phase shift in the first and second polarization components while maintaining a differential phase shift in the first and second polarization components;
photodetectors disposed at an opposite side of the waveplate with respect to the light source and configured to receive a light beam emerging from the waveplate and convert the emerging light beam into electrical signals;
a signal conversion module configured to receive the electrical signals and convert the electrical signals into a digital representation;
a processor configured to receive the digital representation, sense a relative phase between the first and second light polarization components in the emerging light beam, and determine at least one calibration parameter based on the relative phase; and a memory in data communication with the processor and configured to store the at least one calibration parameter.

* * * * *